United States Patent
Park et al.

(10) Patent No.: US 10,414,285 B2
(45) Date of Patent: Sep. 17, 2019

(54) APPARATUS AND METHOD FOR PREVENTING OVER-CHARGING OF BATTERY

(71) Applicant: HYUNDAI AUTRON CO., LTD., Seongnam-si (KR)

(72) Inventors: Jae Seong Park, Suwon-si (KR); Sang Ho Lee, Suwon-si (KR)

(73) Assignee: HYUNDAI AUTRON CO., LTD., Seoul (KR)

( * ) Notice: Subject to any disclaimer, the term of this patent is extended or adjusted under 35 U.S.C. 154(b) by 66 days.

(21) Appl. No.: 15/813,825

(22) Filed: Nov. 15, 2017

(65) Prior Publication Data

US 2018/0134175 A1    May 17, 2018

(30) Foreign Application Priority Data

Nov. 16, 2016  (KR) .................. 10-2016-0152892

(51) Int. Cl.
*B60L 11/18* (2006.01)
*H02J 7/00* (2006.01)
*B60L 3/00* (2019.01)
*B60L 53/14* (2019.01)
(Continued)

(52) U.S. Cl.
CPC ......... *B60L 11/1862* (2013.01); *B60L 3/0046* (2013.01); *B60L 53/14* (2019.02); *B60L 58/13* (2019.02); *B60L 58/15* (2019.02); *H02J 7/0013* (2013.01); *H02J 7/0026* (2013.01); *H02J 7/0029* (2013.01); *B60L 2240/549* (2013.01); *H02J 2007/0037* (2013.01); *Y02T 10/7005* (2013.01); *Y02T 10/705* (2013.01);
(Continued)

(58) Field of Classification Search
CPC .............. B60L 11/1862; B60L 11/1816; B60L 3/0046; B60L 3/0092; H02J 7/0026
USPC .................................................. 320/162
See application file for complete search history.

(56) References Cited

U.S. PATENT DOCUMENTS 3,609,504 A * 9/1971 Barker ................. H02J 7/0024
                                                                    307/141
4,041,363 A * 8/1977 Scheidler ............. H02J 7/1423
                                                                    320/123

(Continued)

FOREIGN PATENT DOCUMENTS

JP      2014-060912 A       4/2014
JP      2016-086468 A       5/2016
KR    10-2014-0140355 A    12/2014

*Primary Examiner* — Robert Grant
*Assistant Examiner* — John T Trischler
(74) *Attorney, Agent, or Firm* — Baker & Hostetler LLP; Hyunho Park

(57) ABSTRACT

The present invention relates to an apparatus for preventing a battery including a master battery and a slave battery from being over-charged, the apparatus including: a master battery management system (BMS) which determines whether the master battery is over-charged, and turns off a main relay which connects or disconnects between the battery and a motor of a vehicle when the master battery is over-charged as a result of the determination; and a slave BMS which determines whether the slave battery is over-charged, and turns off a charging relay which connects or disconnects between the battery and a charger provided outside the vehicle when the slave battery is over-charged as a result of the determination.

9 Claims, 4 Drawing Sheets

US 10,414,285 B2

Page 2

(51) Int. Cl.
*B60L 58/13* (2019.01)
*B60L 58/15* (2019.01)

(52) U.S. Cl.
CPC ........ *Y02T 10/7044* (2013.01); *Y02T 10/7072* (2013.01); *Y02T 90/14* (2013.01)

(56) References Cited

U.S. PATENT DOCUMENTS

| | | | | |
|---|---|---|---|---|
| 4,146,825 | A * | 3/1979 | Harhay | H02J 7/022 320/141 |
| 5,172,045 | A * | 12/1992 | Takeyasu | H02J 7/1423 320/103 |
| 5,229,706 | A * | 7/1993 | Fujiwara | H02J 7/0031 307/66 |
| 5,355,071 | A * | 10/1994 | Ishida | H02J 7/1423 320/110 |
| 5,418,401 | A * | 5/1995 | Kaneyuki | H02J 7/1423 307/10.1 |
| 5,418,444 | A * | 5/1995 | Cook | H02J 7/0024 320/125 |
| 5,488,283 | A * | 1/1996 | Dougherty | H01M 10/0413 307/10.1 |
| 5,684,384 | A * | 11/1997 | Barkat | G06F 1/26 307/66 |
| 5,726,553 | A * | 3/1998 | Waugh | H02J 7/1423 320/104 |
| 5,869,951 | A * | 2/1999 | Takahashi | G01R 31/3648 320/104 |
| 5,977,744 | A * | 11/1999 | Williams | H02J 7/1423 320/104 |
| 6,210,835 | B1 * | 4/2001 | Arai | H01M 6/164 429/231.95 |
| 6,696,202 | B2 * | 2/2004 | Arai | H01M 6/164 429/231.95 |
| 6,815,931 | B1 * | 11/2004 | Wells | H02J 4/00 320/155 |
| 6,923,279 | B2 * | 8/2005 | Shimane | B60K 6/28 180/65.1 |
| 7,019,488 | B2 * | 3/2006 | Nakao | B60L 3/0046 320/104 |
| 7,365,516 | B2 * | 4/2008 | Leyten | H01M 6/425 320/116 |
| 7,567,057 | B2 * | 7/2009 | Elder | B60L 3/0046 320/104 |
| 7,612,524 | B2 * | 11/2009 | Howell | H02J 7/1438 320/104 |
| 7,772,806 | B2 * | 8/2010 | Kitanaka | H02J 7/0029 320/140 |
| 7,872,443 | B2 * | 1/2011 | Ward | H02J 7/35 320/103 |
| 7,944,169 | B2 * | 5/2011 | Shirai | B60L 8/00 320/101 |
| 8,013,574 | B2 * | 9/2011 | Naganuma | H01M 10/441 320/118 |
| 8,093,862 | B2 * | 1/2012 | Mariels | H02J 7/0016 320/116 |
| 8,134,338 | B2 * | 3/2012 | Choi | B60L 3/0046 320/134 |
| 8,143,843 | B2 * | 3/2012 | Ichikawa | B60L 58/12 320/104 |
| 8,350,529 | B2 * | 1/2013 | Loncarevic | H02J 7/0016 320/122 |
| 8,350,534 | B2 * | 1/2013 | Niculae | H02J 7/0013 320/162 |
| 8,378,686 | B2 * | 2/2013 | Kang | G01R 31/396 324/426 |
| 8,442,727 | B2 * | 5/2013 | Yamamoto | B60L 58/20 701/49 |
| 8,547,065 | B2 * | 10/2013 | Trigiani | H02J 7/0018 320/119 |
| 8,552,686 | B2 * | 10/2013 | Jung | H01M 10/44 320/109 |
| 8,593,111 | B2 * | 11/2013 | Tatebayashi | H02J 7/0031 320/128 |
| 8,708,074 | B1 * | 4/2014 | McCoy | B60K 6/52 180/65.51 |
| 8,723,457 | B2 * | 5/2014 | Komatsu | B60L 58/20 318/139 |
| 8,751,081 | B2 * | 6/2014 | Kato | B60K 6/445 701/22 |
| 8,798,832 | B2 * | 8/2014 | Kawahara | H01M 10/441 701/22 |
| 8,836,272 | B2 * | 9/2014 | Sugiyama | B60L 11/14 320/104 |
| 8,952,664 | B2 * | 2/2015 | Lee | H02J 7/0068 320/134 |
| 9,069,044 | B2 * | 6/2015 | Tae | G01R 31/3278 |
| 9,108,521 | B2 * | 8/2015 | Jung | H01M 10/44 |
| 9,190,861 | B2 * | 11/2015 | Kim | H02J 7/007 |
| 9,216,655 | B2 * | 12/2015 | Ishii | B60L 3/00 |
| 9,219,366 | B2 * | 12/2015 | Kim | H02J 7/00 |
| 9,221,345 | B2 * | 12/2015 | Bito | B60L 7/14 |
| 9,296,289 | B2 * | 3/2016 | Yamamoto | B60W 20/40 |
| 9,300,016 | B2 * | 3/2016 | Yun | H01M 10/482 |
| 9,327,610 | B2 * | 5/2016 | Andres | B60L 58/22 |
| 9,373,973 | B2 * | 6/2016 | Lee | H01M 10/482 |
| 9,505,304 | B1 * | 11/2016 | McCoy | B60K 6/52 |
| 9,768,627 | B2 * | 9/2017 | Lee | H02J 7/0031 |
| 9,827,870 | B2 * | 11/2017 | Ahn | B60L 58/20 |
| 9,837,811 | B2 * | 12/2017 | Yamaguchi | H01M 10/44 |
| 9,837,843 | B2 * | 12/2017 | Hansen | H02J 7/0065 |
| 9,932,029 | B2 * | 4/2018 | Pruitt | H02J 7/0014 |
| 9,956,882 | B2 * | 5/2018 | Iida | B60L 53/14 |
| 10,040,355 | B2 * | 8/2018 | Arai | B60L 3/0023 |
| 10,046,656 | B2 * | 8/2018 | Kim | B60L 11/1811 |
| 10,106,038 | B2 * | 10/2018 | Jiang | B60L 58/18 |
| 10,118,495 | B2 * | 11/2018 | Emrani | B60L 58/14 |
| 10,160,325 | B2 * | 12/2018 | Lee | B60L 3/0046 |
| 10,160,326 | B2 * | 12/2018 | Chung | H01M 10/425 |
| 10,179,512 | B2 * | 1/2019 | Matsuda | B60L 3/003 |
| 2002/0140397 | A1 * | 10/2002 | Hasegawa | H02J 7/1423 320/104 |
| 2005/0077874 | A1 * | 4/2005 | Nakao | B60L 3/0046 320/116 |
| 2005/0093508 | A1 * | 5/2005 | Taniguchi | H02J 7/1423 320/104 |
| 2005/0285559 | A1 * | 12/2005 | Siddiqui | B60L 1/14 320/103 |
| 2006/0152197 | A1 * | 7/2006 | Stanesti | H02J 7/0057 320/135 |
| 2008/0018297 | A1 * | 1/2008 | Shirai | B60L 8/00 320/102 |
| 2008/0079389 | A1 * | 4/2008 | Howell | H02J 7/1438 320/104 |
| 2008/0203966 | A1 * | 8/2008 | Ward | H02J 7/35 320/104 |
| 2008/0211459 | A1 * | 9/2008 | Choi | B60L 3/0046 320/134 |
| 2009/0001926 | A1 * | 1/2009 | Sato | B60L 3/0046 320/102 |
| 2009/0146610 | A1 * | 6/2009 | Trigiani | H02J 7/0018 320/119 |
| 2010/0052614 | A1 * | 3/2010 | Mariels | H02J 7/0016 320/116 |
| 2010/0052615 | A1 * | 3/2010 | Loncarevic | H02J 7/0016 320/118 |
| 2010/0072950 | A1 * | 3/2010 | Tatebayashi | H02J 7/0021 320/134 |
| 2010/0181966 | A1 * | 7/2010 | Sakakibara | B25F 5/00 320/136 |
| 2010/0219794 | A1 * | 9/2010 | Sugimoto | B60L 50/40 320/128 |
| 2010/0318250 | A1 * | 12/2010 | Mitsutani | B60K 1/02 701/22 |
| 2011/0012560 | A1 * | 1/2011 | Sakakibara | H01M 10/441 320/118 |
| 2011/0089904 | A1 * | 4/2011 | Ward | B60L 8/003 320/126 |

(56) References Cited

U.S. PATENT DOCUMENTS

| | | | |
|---|---|---|---|
| 2011/0169448 A1* | 7/2011 | Ichikawa | B60L 58/12 320/109 |
| 2011/0307733 A1* | 12/2011 | Tokunaga | H02J 7/0024 713/340 |
| 2011/0313613 A1* | 12/2011 | Kawahara | H01M 10/441 701/34.4 |
| 2012/0041630 A1* | 2/2012 | Yamamoto | B60W 20/40 701/22 |
| 2012/0049771 A1* | 3/2012 | Komatsu | B60L 58/20 318/139 |
| 2012/0056584 A1* | 3/2012 | Mariels | H02J 7/0016 320/109 |
| 2012/0056585 A1* | 3/2012 | Mariels | H02J 7/0016 320/116 |
| 2012/0065828 A1* | 3/2012 | Kato | B60W 20/10 701/22 |
| 2012/0072063 A1* | 3/2012 | Kato | B60K 6/445 701/22 |
| 2012/0112688 A1* | 5/2012 | Ho | H02J 7/0021 320/107 |
| 2012/0143425 A1* | 6/2012 | Yamamoto | B60L 58/20 701/22 |
| 2012/0256568 A1* | 10/2012 | Lee | H02J 7/0024 318/139 |
| 2012/0268068 A1* | 10/2012 | Jung | H01M 10/44 320/109 |
| 2012/0313584 A1* | 12/2012 | Sugiyama | B60L 11/14 320/119 |
| 2013/0002203 A1* | 1/2013 | Kuraishi | H02J 7/0018 320/134 |
| 2013/0009648 A1* | 1/2013 | Tae | G01R 31/3278 324/503 |
| 2013/0093394 A1* | 4/2013 | Iyasu | H02M 3/155 320/109 |
| 2013/0207613 A1* | 8/2013 | Loncarevic | H02J 7/0016 320/134 |
| 2013/0249219 A1* | 9/2013 | Kim | H02J 7/007 290/36 R |
| 2013/0293197 A1* | 11/2013 | Sakakibara | B25F 5/00 320/118 |
| 2014/0002026 A1* | 1/2014 | Jung | H01M 10/44 320/109 |
| 2014/0028098 A1* | 1/2014 | Trigiani | H02J 7/0018 307/39 |
| 2014/0070772 A1 | 3/2014 | Andres et al. | |
| 2014/0077771 A1* | 3/2014 | Yamashita | B60K 6/28 320/167 |
| 2014/0079960 A1* | 3/2014 | Yun | H02J 7/34 429/7 |
| 2014/0091750 A1* | 4/2014 | Ikeda | H02J 1/10 320/104 |
| 2014/0184142 A1* | 7/2014 | Bito | B60L 7/14 320/104 |
| 2014/0203738 A1* | 7/2014 | Yamazaki | H01M 10/44 318/139 |
| 2014/0203786 A1* | 7/2014 | Oosawa | H02J 7/0031 320/136 |
| 2014/0210420 A1* | 7/2014 | Lee | H02J 7/0068 320/134 |
| 2014/0217972 A1* | 8/2014 | Ishii | B60L 3/00 320/109 |
| 2014/0217986 A1* | 8/2014 | Skipper | H02J 7/0057 320/134 |
| 2014/0252847 A1* | 9/2014 | Yang | B60R 16/03 307/9.1 |
| 2014/0365792 A1* | 12/2014 | Yun | G06F 1/3212 713/320 |
| 2015/0069960 A1* | 3/2015 | Kuraishi | B60L 58/12 320/107 |
| 2015/0200553 A1* | 7/2015 | Endo | H01M 2/1072 320/134 |
| 2015/0295420 A1* | 10/2015 | Cheng | H02J 7/0003 320/128 |
| 2016/0016483 A1* | 1/2016 | Yasunori | H01M 10/44 320/162 |
| 2016/0020629 A1* | 1/2016 | Lee | H01M 10/482 320/164 |
| 2016/0056646 A1* | 2/2016 | Lee | H02J 7/0031 320/163 |
| 2016/0126760 A1* | 5/2016 | Murata | H02J 7/007 320/107 |
| 2016/0207403 A1* | 7/2016 | Iida | B60L 53/14 |
| 2016/0250928 A1* | 9/2016 | Matsuda | B60L 3/003 701/22 |
| 2017/0001537 A1* | 1/2017 | Ahn | B60L 58/20 |
| 2017/0021739 A1* | 1/2017 | Tsuji | H01M 2/1083 |
| 2017/0126034 A1* | 5/2017 | Kim | H01M 10/425 |
| 2017/0141596 A1* | 5/2017 | Hansen | H02J 7/0065 |
| 2017/0274796 A1* | 9/2017 | Nomura | B60H 1/00642 |
| 2018/0065487 A1* | 3/2018 | Hori | B60L 3/0046 |
| 2018/0147948 A1* | 5/2018 | Ohiwa | H02J 7/0027 |
| 2018/0152030 A1* | 5/2018 | Shin | H02J 7/0031 |
| 2018/0222345 A1* | 8/2018 | Patel | B60L 58/12 |

\* cited by examiner

APPARATUS AND METHOD FOR PREVENTING OVER-CHARGING OF BATTERY

CROSS-REFERENCE TO RELATED APPLICATIONS

This application claims priority to and the benefit of Korean Patent Application No. 10-2016-0152892 filed in the Korean Intellectual Property Office on Nov. 16, 2016, the entire contents of which are incorporated herein by reference.

TECHNICAL FIELD

The present invention relates to a technology for preventing over-charging of a battery, which is usable in a device using electric energy. Particularly, the present invention relates to a technology for preventing over-charging of a high voltage battery used in a hybrid vehicle, a plug-in hybrid vehicle, and an electric vehicle.

BACKGROUND ART

Recently, various devices, such as industrial machinery, household appliances, and vehicles, using a high voltage battery have emerged, and particularly, a high voltage battery has been more actively used in a vehicle technical field.

A vehicle using an internal combustion engine that uses fossil fuel, such as gasoline or heavy oil, as main fuel severely influences generation of pollution, such as atmospheric pollution. Therefore, recently, in order to decrease the generation of pollution, a lot of efforts is made to develop an electric vehicle (EV) or a hybrid vehicle.

The EV refers to a vehicle which does not use oil fuel and an engine, but uses an electric battery and an electric motor. That is, an EV which drives a vehicle by rotating a motor with electricity accumulated in a battery is developed before a gasoline vehicle, but the EV was not commercialized due to problems, such as a heavy battery and a charging time. However, as the energy and environment problems are recently getting serious, research on commercialization of the EV begins from 1990s.

In the meantime, recently, as a battery technology is remarkably developed, an EV and a hybrid electric vehicle (HEV) adaptively using fossil fuel and electric energy have been commercialized.

Since the HEV uses both gasoline and electricity as a power source, the HEV receives positive reviews in an aspect of improvement of fuel efficiency and a decrease in exhaust gas. In a case of the HEV, it is a matter of overcoming a difference in a price between the HEV and a gasoline vehicle, and the amount of secondary batteries mounted may be decreased to a level of ⅓ of that of the EV, so that it is expected that the HEV may serve a transitional role in evolving into a complete EV.

The HEV and the EV using electric energy use a battery, in which a plurality of chargeable/dischargeable secondary cells is formed in the form of one pack, as a main power source, so that the HEV and the EV have advantages in that no exhaust gas and very little noise are generated.

As described above, in the vehicle using electric energy, battery performance directly influences performance of the vehicle, so that a battery management system (BMS), which is capable of efficiently managing charging/discharging of each battery cell by measuring a voltage of each battery cell and a voltage, a current, and the like of the entire batteries, and is capable of stably controlling a corresponding cell by monitoring a state of a cell sensing IC that senses each battery cell, is required.

In the meantime, a form of the BMS is changed according to a structure of the battery. In this case, unlike a general HEV, a plug-in HEV includes a high voltage charging system, as well as a high voltage battery system, so that a space, in which a battery is mountable, is limited. Accordingly, in the PHEV, the entire battery cells are divided into a master battery and a slave battery and are mounted at different positions in the vehicle. In this case, the BMS may be formed of a master BMS that manages a master battery and a slave BMS that manages a slave battery.

In the master BMS and the slave BMS, the master BMS controls a charging/discharging state of the master battery and controls on/off of a main relay that connects the battery and a motor of the vehicle. Further, the slave BMS controls a charging/discharging state of the slave battery and controls on/off of a charging relay that connects the battery and a charger. That is, the master BMS and the slave BMS are independently operated.

Accordingly, when the master battery is over-charged during charging of the battery, the master BMS may turn off the main relay to prevent an over-current from flowing into the motor of the vehicle, but the master BMS cannot control the charging relay, so that there is a problem in that it is impossible to prevent the mater battery from being continuously over-charged.

SUMMARY OF THE INVENTION

The present invention has been made in an effort to provide an apparatus and a method for preventing over-charging, which transmit an over-charging signal between a master battery management system (BMS) and a slave BMS when the master BMS and the slave BMS are over-charged.

An exemplary embodiment of the present invention provides an apparatus for preventing a battery including a master battery and a slave battery from being over-charged, the apparatus including: a master battery management system (BMS) which determines whether the master battery is over-charged, and turns off a main relay which connects or disconnects the battery and a motor of a vehicle when the master battery is over-charged as a result of the determination; and a slave BMS which determines whether the slave battery is over-charged, and turns off a charging relay which connects or disconnects the battery and a charger provided outside the vehicle when the slave battery is over-charged as a result of the determination, in which when any one of the master battery and the slave battery is over-charged during the charging of the battery, any one of the master BMS and the slave BMS transmits an over-charging signal representing that any one of the master battery and the slave battery is over-charged to the other BMS, and when any one of the master BMS and the slave BMS receives the over-charging signal, any one of the master BMS and the slave BMS turns off the main relay or the charging relay.

In the exemplary embodiment, when a voltage of a battery cell included in the master battery is higher than an over-charging reference voltage, the master BMS may determine that the master battery is over-charged.

In the exemplary embodiment, when the master battery is over-charged during the charging of the battery, the master BMS may transmit the first over-charging signal that notifies the over-charging of the master battery to the slave BMS, and when the slave BMS receives the first over-charging signal, the slave BMS may turn off the charging relay.

In the exemplary embodiment, when it is determined that the slave battery is over-charged or the first over-charging signal is received from the master BMS, the slave BMS may turn off the charging relay.

In the exemplary embodiment, when a voltage of a battery cell included in the slave battery is higher than an over-charging reference voltage, the slave BMS may determine that the slave battery is over-charged.

In the exemplary embodiment, when the slave battery is over-charged during the charging of the battery, the slave BMS may transmit the second over-charging signal that notifies the over-charging of the slave battery to the master BMS, and when the master BMS receives the second over-charging signal, the master BMS may turn off the main relay.

In the exemplary embodiment, when it is determined that the master battery is over-charged or the second over-charging signal is received from the slave BMS, the master BMS may turn off the main relay.

Another exemplary embodiment of the present invention provides a method of preventing a battery including a master battery and a slave battery from being over-charged, the method including: determining over-charging, in which an over-charged battery is determined between the master battery and the slave battery during charging of the battery; turning off a main relay, in which when the master battery is over-charged as a result of the determination in the determining of the over-charging, a master BMS connects the battery and a motor of a vehicle or separates the battery from the motor of the vehicle; transmitting a first over-charging signal, in which the master BMS transmits a first over-charging signal that notifies over-charging of the master battery to a slave BMS; and turning off a charging relay, in which when the first over-charging signal is received in the transmitting of the first over-charging signal, the battery is connected with a charger provided outside the vehicle or the battery is separated from the charger.

Still another exemplary embodiment of the present invention provides a method of preventing a battery including a master battery and a slave battery from being over-charged, the method including: determining over-charging, in which an over-charged battery is determined between the master battery and the slave battery during charging of the battery; turning off a charging relay, in which when the slave battery is over-charged as a result of the determination in the determining of the over-charging, a slave BMS connects the battery and a charger of a vehicle provided outside a vehicle or separates the battery from the charger; transmitting a second over-charging signal, in which the slave BMS transmits a second over-charging signal that notifies over-charging of the slave battery to a master BMS; and turning off a main relay, in which when the second over-charging signal is received in the transmitting of the second over-charging signal, the battery is connected with a motor of a vehicle or the battery is separated from the motor of the vehicle.

The present invention has an effect of transmitting, by the master BMS and the slave BMS, an over-charging signal between the master BMS and the slave BMS even when any one of the master battery and the slave battery is over-charged during the charging.

Accordingly, even when any one of the master battery and the slave battery is over-charged during the charging, the master BMS and the slave BMS turn off both the main relay and the charging relay.

Therefore, there is an effect of decreasing danger in a safe accident, such as vehicle fire or explosion, due to over-charging of the battery.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
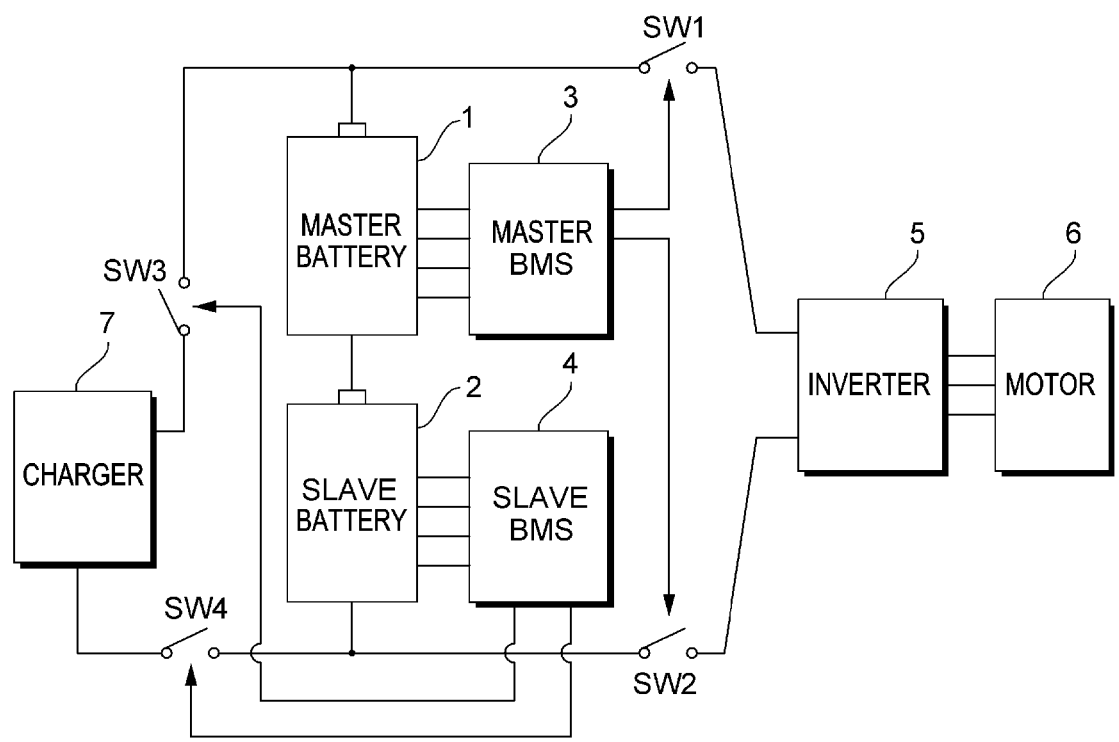
FIG. 1 is a configuration diagram including a master BMS and a slave BMS.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

Hereinafter, an over-charging preventing apparatus according to an exemplary embodiment of the present invention will be described with reference to FIGS. 1 and 2.

FIG. 1 is a configuration diagram including a master battery management system (BMS) and a slave BMS. Referring to FIG. 1, a connection relationship between a master battery 1, a slave battery 2, a master BMS 3, a slave BMS 4, an inverter 5, a motor 6, and a charger 7 may be confirmed.

The master battery 1 and the slave battery 2 may include a high voltage battery mounted in a hybrid vehicle or an electric vehicle. Particularly, the master battery 1 and the slave battery 2 may include a high voltage battery mounted in a plug-in hybrid electric vehicle (PHEV). In this case, the master battery 1 and the slave battery 2 are concepts defined for dividing positions, at which the batteries are mounted, and structures and characteristics of the master battery 1 and the slave battery 2 may be the same.

For example, when 96 battery cells are required for driving the PHEV, 48 battery cells among the 96 battery cells may be mounted at a position of an auxiliary tire at a lower end of a trunk of the vehicle, and the 48 remaining battery cells among the 96 battery cells may be mounted at a rear side of a rear seat of the vehicle. In this case, the battery mounted at the position of the auxiliary tire at the lower end of the trunk of the vehicle may be defined as the master battery 1, and the battery mounted at the rear side of the rear seat of the vehicle may be defined as the slave battery 2. On the contrary, the battery mounted at the position of the auxiliary tire at the lower end of the trunk of the vehicle may be defined as the slave battery 2, and the battery mounted at the rear side of the rear seat of the vehicle may be defined as the master battery 1.

In the exemplary embodiment, when the main relays SW1 and SW2 are turned on, the master battery 1 and the slave battery 2 may supply power to the motor 6 through the inverter 5. In the exemplary embodiment, when the main relays SW1 and SW2 are turned on, the master battery 1 and the slave battery 2 may receive power from the motor 6 through the inverter 5. In this case, the inverter 5 may serve to convert a direct current and an alternating current.

In the meantime, when the charging relays SW3 and SW4 are turned on, the master battery 1 and the slave battery 2 may receive power through the charger 7 and be charged. In this case, the charger 7 may receive power from a power supplying source positioned at the outside of the vehicle.

In the exemplary embodiment, the master BMS 3 may determine whether the master battery 1 is over-charged. Particularly, when a voltage of the battery cell included in the master battery 1 is higher than an over-charging reference voltage, the master BMS 3 may determine that the master battery 1 is over-charged. That is, when 48 battery cells are included in the master battery 1 and a voltage of even one battery cell among the 48 battery cells is higher than the over-charging reference voltage, the master BMS 3 may determine that the master battery 1 is over-charged.

In the exemplary embodiment, when the master battery 1 is over-charged, the master BMS 3 may turn off the main relays SW1 and SW2. Accordingly, an over-current may be prevented from flowing into the motor 6. On the other hand, when the master battery 1 and the slave battery 2 are being charged, the charging relays SW3 and SW4 are still turned on, so that there is a problem in that it is impossible to solve an over-charging situation of the master battery 1 only by turning off the main relays SW1 and SW2.

In the exemplary embodiment, the slave BMS 4 may determine whether the slave battery 2 is over-charged. Particularly, when a voltage of the battery cell included in the slave battery 2 is equal to or higher than the over-charging reference voltage, the slave BMS 4 may determine that the slave battery 2 is over-charged. That is, when 48 battery cells are included in the slave battery 2 and a voltage of even one battery cell among the 48 battery cells is higher than the over-charging reference voltage, the slave BMS 4 may determine that the slave battery 2 is over-charged.

In the exemplary embodiment, the slave BMS 4 may turn off the charging relays SW3 and SW4 when the slave battery 2 is over-charged. Accordingly, the slave battery 2 may be prevented from being over-charged. On the other hand, the main relays SW1 and SW are still turned on, so that there may be a problem in that an over-current may flow into the motor 6 only with turning off the charging relays SW3 and SW4.

In order to solve the foregoing problems, over-charging state information of the master battery 1 or the slave battery 2 needs to be shared between the master BMS 3 and the slave BMS 4.

Figure 2:
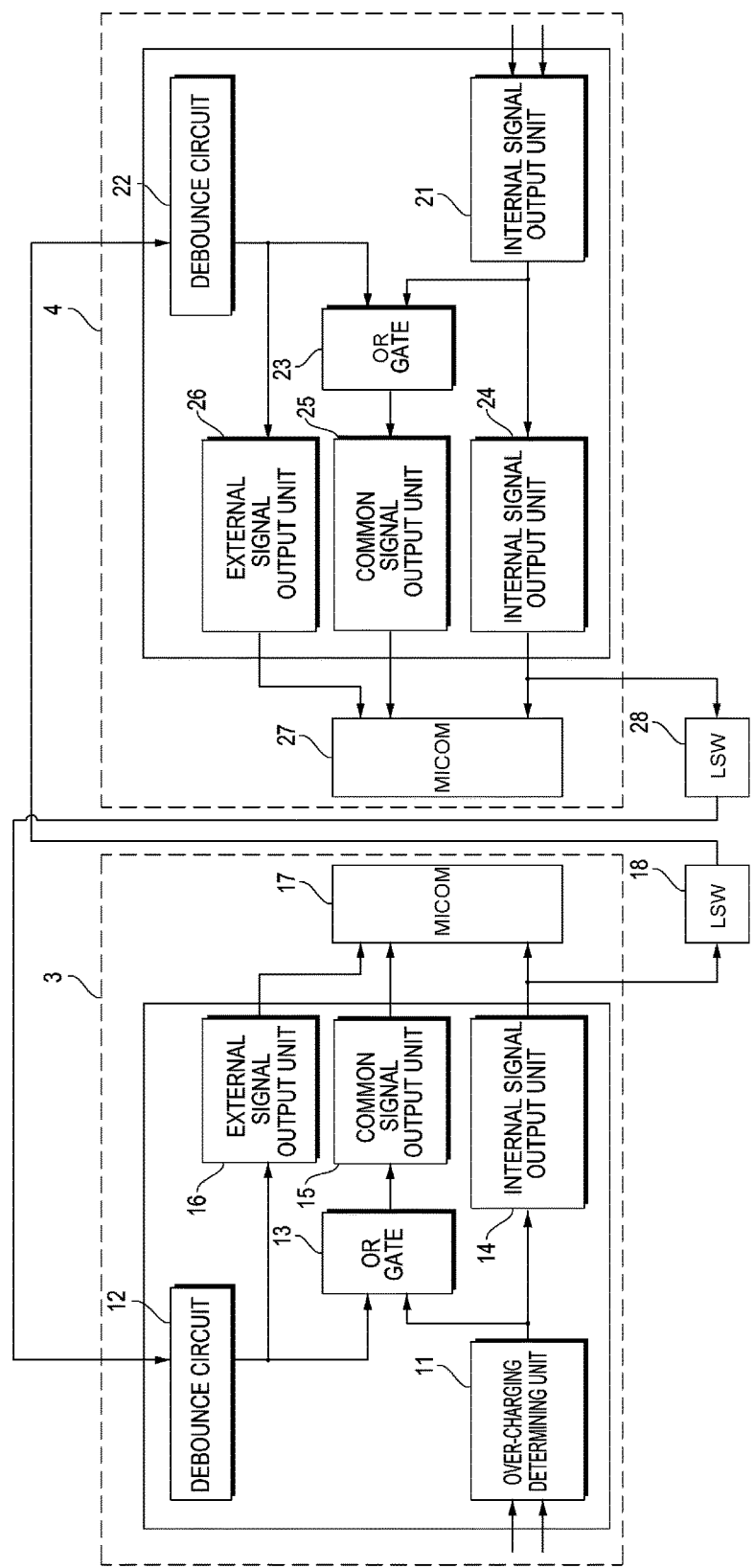
FIG. 2 is a block diagram illustrating an over-charging preventing apparatus according to an exemplary embodiment of the present invention.

FIG. 2 is a block diagram illustrating an over-charging preventing apparatus according to an exemplary embodiment of the present invention.

Referring to FIG. 2, the over-charging preventing apparatus according to the exemplary embodiment of the present invention may include the master BMS 3 and the slave BMS 4.

The master BMS 3 may include an over-charging determining unit 11, a debounce circuit 12, an OR gate 13, an internal signal output unit 14, a common signal output unit 15, an external signal output unit 16, and a micom 17.

The over-charging determining unit 11 may determine whether the master battery 1 is over-charged. When it is determined that the master battery 1 is over-charged, the over-charging determining unit 11 may transmit a first over-charging signal to the OR gate 13 and the internal signal output unit 14. Herein, the first over-charging signal means a signal representing that the master battery 1 is over-charged.

The debounce circuit 12 may confirm whether a signal transmitted from the slave BMS 4 to the master BMS 3 is noise. Particularly, when the signal transmitted from the slave BMS 4 to the master BMS 3 is transmitted for a time less than a predetermined time, the debounce circuit 12 may determine that the transmitted signal is noise and block the transmitted signal. On the other hand, when the signal transmitted from the slave BMS 4 to the master BMS 3 is transmitted for the predetermined time or longer, the debounce circuit 12 may determine that the transmitted signal is a second over-charging signal and transmit the transmitted signal to the OR gate 13 and the external signal output unit 16.

When the first over-charging signal is transmitted from the over-charging determining unit 11 or the second over-charging signal is transmitted from the debounce circuit 12, the OR gate 13 may transmit the transmitted signal to the common signal output unit 15.

When the first over-charging signal is transmitted from the over-charging determining unit 11, the internal signal output unit 14 may transmit the first over-charging signal to the slave BMS 4 through the micom 17 and a low side switch (LSW) 18. Accordingly, even when the master battery 1 is over-charged, information on the over-charging state of the master battery 1 may be notified even to the slave BMS 4.

When the first over-charging signal is received from the OR gate 13, the common signal output unit 15 may transmit the first over-charging signal to the micom 17 and the main relays SW1 and SW2. Accordingly, the main relays SW1 and SW2 may be turned off.

When the second over-charging signal is received from the debounce circuit 12, the common signal output unit 15 may transmit the second over-charging signal to the micom 17.

When the first over-charging signal is received only from the internal signal output unit 14, the micom 17 may recognize that the main relays SW1 and SW2 are turned off by the master BMS 3. On the other hand, when the second over-charging signal is received only from the external signal output unit 16, the micom 17 may recognize that the main relays SW1 and SW2 are turned off by the slave BMS 4. Accordingly, the micom 17 may confirm whether the slave battery 2 is over-charged, as well as whether the master battery 1 is over-charged.

The slave BMS 4 may include an over-charging determining unit 21, a debounce circuit 22, an OR gate 23, an internal signal output unit 24, a common signal output unit 25, an external signal output unit 26, and a micom 27.

The over-charging determining unit 21 may determine whether the slave battery 2 is over-charged. When it is determined that the slave battery 2 is over-charged, the over-charging determining unit 21 may transmit a second over-charging signal to the OR gate 23 and the internal signal output unit 24. Herein, the second over-charging signal means a signal representing that the slave battery 2 is over-charged.

The debounce circuit 22 may confirm whether a signal transmitted from the master BMS 3 to the slave BMS 4 is noise. Particularly, when the signal transmitted from the master BMS 3 to the slave BMS 4 is transmitted for a time less than a predetermined time, the debounce circuit 22 may determine that the transmitted signal is noise and block the transmitted signal. On the other hand, when the signal transmitted from the master BMS 3 to the slave BMS 4 is transmitted for the predetermined time or longer, the debounce circuit 22 may determine that the transmitted signal is the first over-charging signal and transmit the transmitted signal to the OR gate 23 and the external signal output unit 26.

When the second over-charging signal is transmitted from the over-charging determining unit 21 or the first over-charging signal is transmitted from the debounce circuit 22, the debounce circuit 22 may transmit the transmitted signal to the common signal output unit 25.

When the second over-charging signal is received from the over-charging determining unit 21, the debounce circuit 22 may transmit the second over-charging signal to the master BMS 3 through the micom 27 and a low side switch (LSW) 28. Accordingly, even when the slave battery 2 is over-charged, information on the over-charging state of the slave battery 2 may be notified even to the master BMS 3.

When the second over-charging signal is received from the OR gate 23, the debounce circuit 22 may transmit the second over-charging signal to the micom 27 and the charging relays SW3 and SW4. Accordingly, the charging relays SW3 and SW4 may be turned off.

When the first over-charging signal is received from the debounce circuit 22, the external signal output unit 26 may transmit the first over-charging signal to the micom 27.

When the second over-charging signal is received only from the internal signal output unit 24, the micom 27 may recognize that the charging relays SW3 and SW4 are turned off by the slave BMS 4. On the other hand, when the first over-charging signal is received only from the external signal output unit 26, the micom 27 may recognize that the charging relays SW3 and SW4 are turned off by the master BMS 3. Accordingly, the micom 27 may also confirm whether the master battery 3 is over-charged, as well as whether the slave battery 2 is over-charged.

Accordingly, the BMS according to the exemplary embodiment of the present invention may be implemented so that even when any one of the master battery 1 and the slave battery 2 is over-charged during the charging, the over-charging signal may be transmitted between the master BMS 3 and the slave BMS 4. Accordingly, even when any one of the master battery 1 and the slave battery 2 is over-charged during the charging, all of the main relays SW1 and SW2 and the charging relays SW3 and SW4 may be turned off. Accordingly, there is an effect of decreasing danger in a safe accident, such as vehicle fire or explosion, due to over-charging of the battery.

Hereinafter, an over-charging preventing method according to an exemplary embodiment of the present invention will be described with reference to FIGS. 3 and 4. In this case, descriptions of parts overlapping the parts described with reference to FIGS. 1 and 2 will be omitted.

Figure 3:
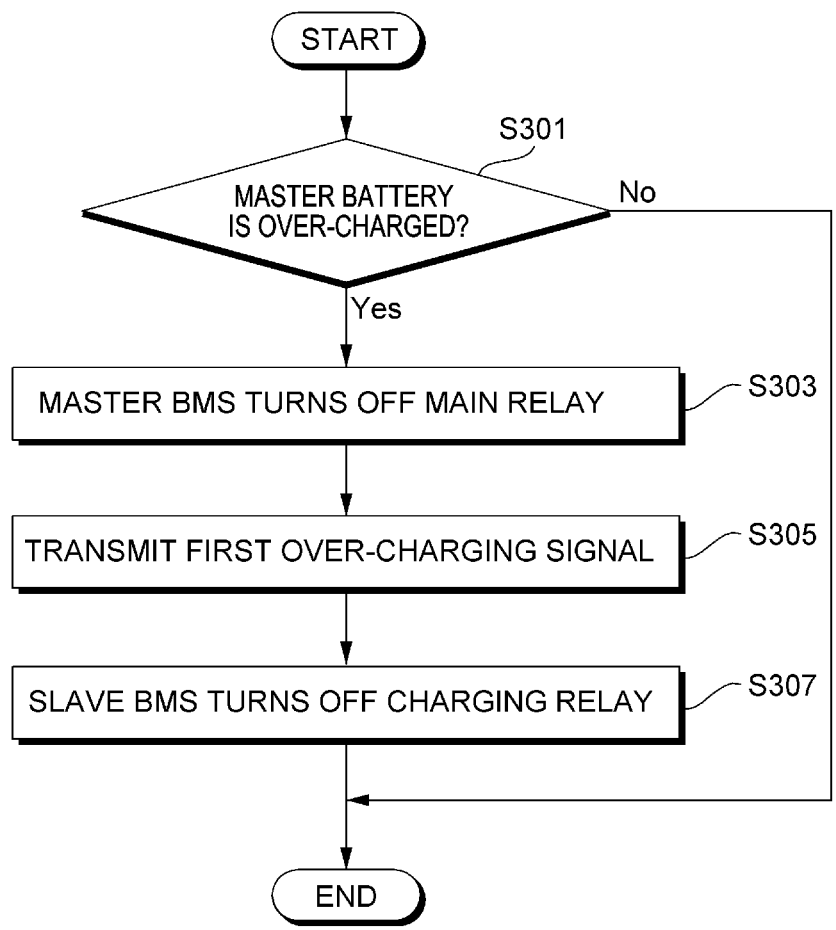
FIG. 3 is a flowchart illustrating an over-charging preventing method by an over-charging preventing apparatus when a master battery is over-charged according to an exemplary embodiment of the present invention.

FIG. 3 is a flowchart illustrating an over-charging preventing method by the over-charging preventing apparatus when the master battery is over-charged according to an exemplary embodiment of the present invention.

Referring to FIG. 3, first, the master BMS 3 may determine whether the master battery 1 is over-charged (S301).

Then, when the master battery 1 is over-charged as a result of the determination of operation S301, the master BMS 3 may turn off the main relays SW1 and SW2 for connecting or disconnecting between the battery and the motor 6 of a vehicle (S303).

Then, the master BMS 3 may transmit a first over-charging signal that notifies the over-charging of the master battery 1 to the slave BMS 4 (S305).

Then, when the first over-charging signal is received from the master BMS 3, the slave BMS 40 may turn off the charging relays SW3 and SW4 for connecting or disconnecting the battery and the charger 7 provided outside the vehicle (S307).

Figure 4:
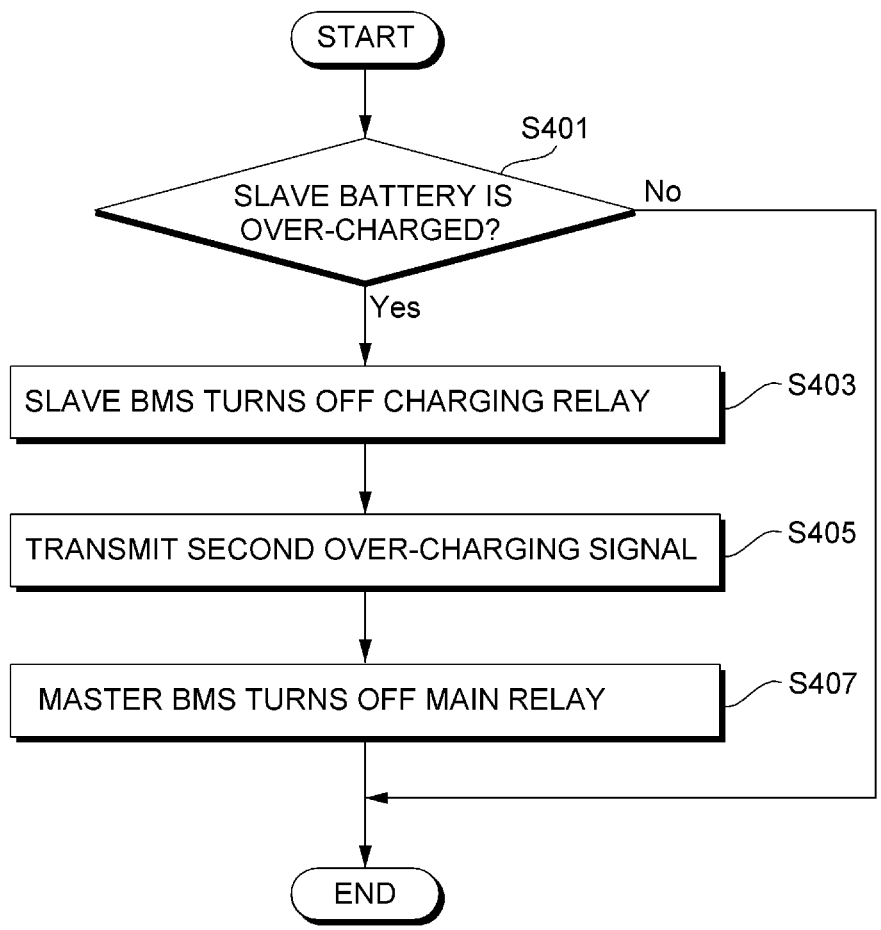
FIG. 4 is a flowchart illustrating an over-charging preventing method by an over-charging preventing apparatus when a slave battery is over-charged according to an exemplary embodiment of the present invention.

FIG. 4 is a flowchart illustrating an over-charging preventing method by the over-charging preventing apparatus when the slave battery is over-charged according to an exemplary embodiment of the present invention.

Referring to FIG. 4, first, the slave BMS 4 may determine whether the slave battery 2 is over-charged (S401).

Then, when the slave battery 2 is over-charged as a result of the determination of operation S401, the slave BMS 4 may turn off the charging relays SW3 and SW4 (S403).

Then, the slave BMS 4 may transmit a second over-charging signal that notifies the over-charging of the slave battery 2 to the master BMS 3 (S405).

Then, when the second over-charging signal is received from the slave BMS 4, the master BMS 30 may turn off the main relays SW1 and SW2 (S407).

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for preventing overcharging of a battery including a master battery and a slave battery, the apparatus comprising:
    a master battery management system (BMS) configured to determine whether the master battery is over-charged, and turn off a main relay which connects or disconnects between the battery and a motor of a vehicle when the master battery is over-charged as a result of the determination; and
    a slave BMS configured to determine whether the slave battery is over-charged, and turn off a charging relay which connects or disconnects between the battery and a charger provided outside the vehicle when the slave battery is over-charged as a result of the determination, wherein when the master battery is over-charged, the master BMS generates a first over-charging signal and transmits the first over-charging signal to the slave BMS, when the slave battery is over-charged, the slave BMS generates a second over-charging signal and transmits the second over-charging signal to the master BMS, the slave BMS turns off the charging relay in response to the first over-charging signal, and the master BMS turns off the main relay in response to the second over-charging signal, wherein when the master battery or the slave battery is over-charged, both the main relay and the charging relay are turned off.

2. The apparatus of claim 1, wherein when a voltage of a battery cell included in the master battery is higher than an over-charging reference voltage, the master BMS determines that the master battery is over-charged.

3. The apparatus of claim 1, wherein when a voltage of a battery cell included in the slave battery is higher than an over-charging reference voltage, the slave BMS determines that the slave battery is over-charged.

4. The apparatus of claim 1, wherein when the master battery is over-charged during the charging of the battery, the master BMS transmits the first over-charging signal that notifies the over-charging of the master battery to the slave BMS, and when the slave BMS receives the first over-charging signal, the slave BMS turns off the charging relay.

5. The apparatus of claim 4, wherein when it is determined that the slave battery is over-charged or the first over-charging signal is received from the master BMS, the slave BMS turns off the charging relay.

6. The apparatus of claim 1, wherein when the slave battery is over-charged during the charging of the battery, the slave BMS transmits the second over-charging signal that notifies the over-charging of the slave battery to the master BMS, and when the master BMS receives the second over-charging signal, the master BMS turns off the main relay.

7. The apparatus of claim 6, wherein when it is determined that the master battery is over-charged or the second over-charging signal is received from the slave BMS, the slave BMS turns off the main relay.

8. A method of preventing overcharging of a battery including a master battery and a slave battery, the method comprising:

determining over-charging, in which an over-charged battery is determined between the master battery and the slave battery during charging of the battery;

turning off a main relay which connects or disconnects between the battery and a motor of a vehicle when the master battery is over-charged as a result of the determination in the determining of the over-charging;

transmitting a first over-charging signal, in which a master battery management system (BMS) transmits a first over-charging signal that notifies over-charging of the master battery to a slave BMS; and turning off a charging relay which connects or disconnects between the battery and a charger provided outside the vehicle when the first over-charging signal is received in the transmitting of the first over-charging signal, wherein when the master battery is over-charged, both the main relay and the charging relay are turned off.

9. A method of preventing overcharging of a battery including a master battery and a slave battery, the method comprising:

determining over-charging, in which an over-charged battery is determined between the master battery and the slave battery during charging of the battery;

turning off a charging relay, by a slave battery management system (BMS), which connects or disconnects between the battery and a charger of a vehicle provided outside a vehicle when the slave battery is over-charged as a result of the determination in the determining of the over-charging;

transmitting an over-charging signal, in which the slave BMS transmits the over-charging signal that notifies over-charging of the slave battery to a master BMS; and turning off a main relay, by the master BMS, in which when the over-charging signal is received in the transmitting of the over-charging signal of the over-charging of the slave battery, the battery is connected with a motor of a vehicle or the battery is separated from the motor of the vehicle, wherein when the slave battery is over-charged, both the main relay and the charging relay are turned off.

* * * * *